(12) United States Patent
Wang (10) Patent No.: US 8,033,387 B2
(45) Date of Patent: Oct. 11, 2011

(54) CONVEYOR BELT OR TREADMILL BELT

(76) Inventor: Shuei Mu Wang, Taichung (TW)

(*) Notice: Subject to any disclaimer, the term of this patent is extended or adjusted under 35 U.S.C. 154(b) by 190 days.

(21) Appl. No.: 12/474,139

(22) Filed: May 28, 2009

(65) Prior Publication Data
US 2010/0300850 A1    Dec. 2, 2010

(51) Int. Cl.
*B65G 15/34*    (2006.01)
(52) U.S. Cl. ......................................................... 198/847
(58) Field of Classification Search ........................ None
See application file for complete search history.

(56) References Cited

U.S. PATENT DOCUMENTS

| | | | | |
|---|---|---|---|---|
| 2,520,594 A | * | 8/1950 | Costa | 68/204 |
| 3,029,166 A | * | 4/1962 | Hainsworth et al. | 427/122 |
| 6,972,144 B2 | * | 12/2005 | Roth et al. | 428/68 |

* cited by examiner

*Primary Examiner* — Kavel Singh (57) ABSTRACT

A conveyor belt or treadmill belt comprises a cloth layer woven by at least one warp and woof and having an outer surface and an inner surface in response to each other, a clearance passing through the inner and the outer surfaces and being formed between the warp and the woof of the cloth layer; a pattern layer in response to the outer surface of the cloth layer including patterns formed thereon; a laminating layer melted to couple between the outer surface of the cloth layer and the pattern layer, such that the laminating layer merges into the clearance between the warp and the woof so that the laminating layer is integrally formed a rough connecting surface, the connecting surface engaging with the clearance of the cloth layer, hence another surface of the laminating layer is in connection with the pattern layer.

14 Claims, 8 Drawing Sheets

CONVEYOR BELT OR TREADMILL BELT

BACKGROUND OF THE INVENTION

1. Field of the Invention

The present invention relates to a conveyor belt or treadmill belt that can couple the pattern layer onto an outer surface of the cloth layer without through laminating process to enhance production efficiency.

2. Description of the Prior Art

Figure 1:
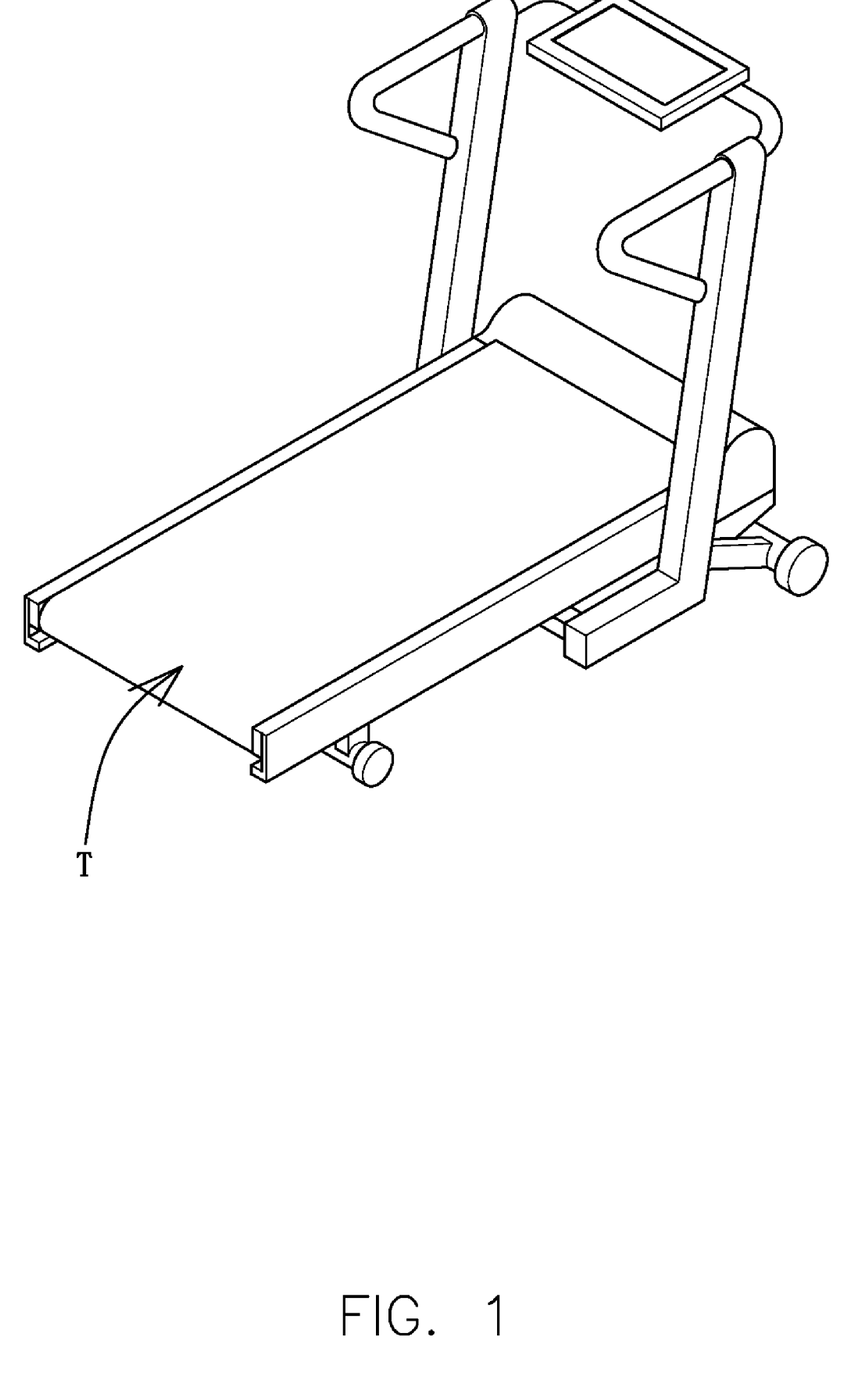
FIG. 1 is a perspective view of a conventional treadmill.

Referring to FIG. 1, a conventional conveyor belt or treadmill belt are coupled together in high frequency manner so that the conveyor belt or treadmill belt can be fixed on front and rear transmission wheels (not shown) respectively, obtaining conveying and stepping function.

Figure 2:
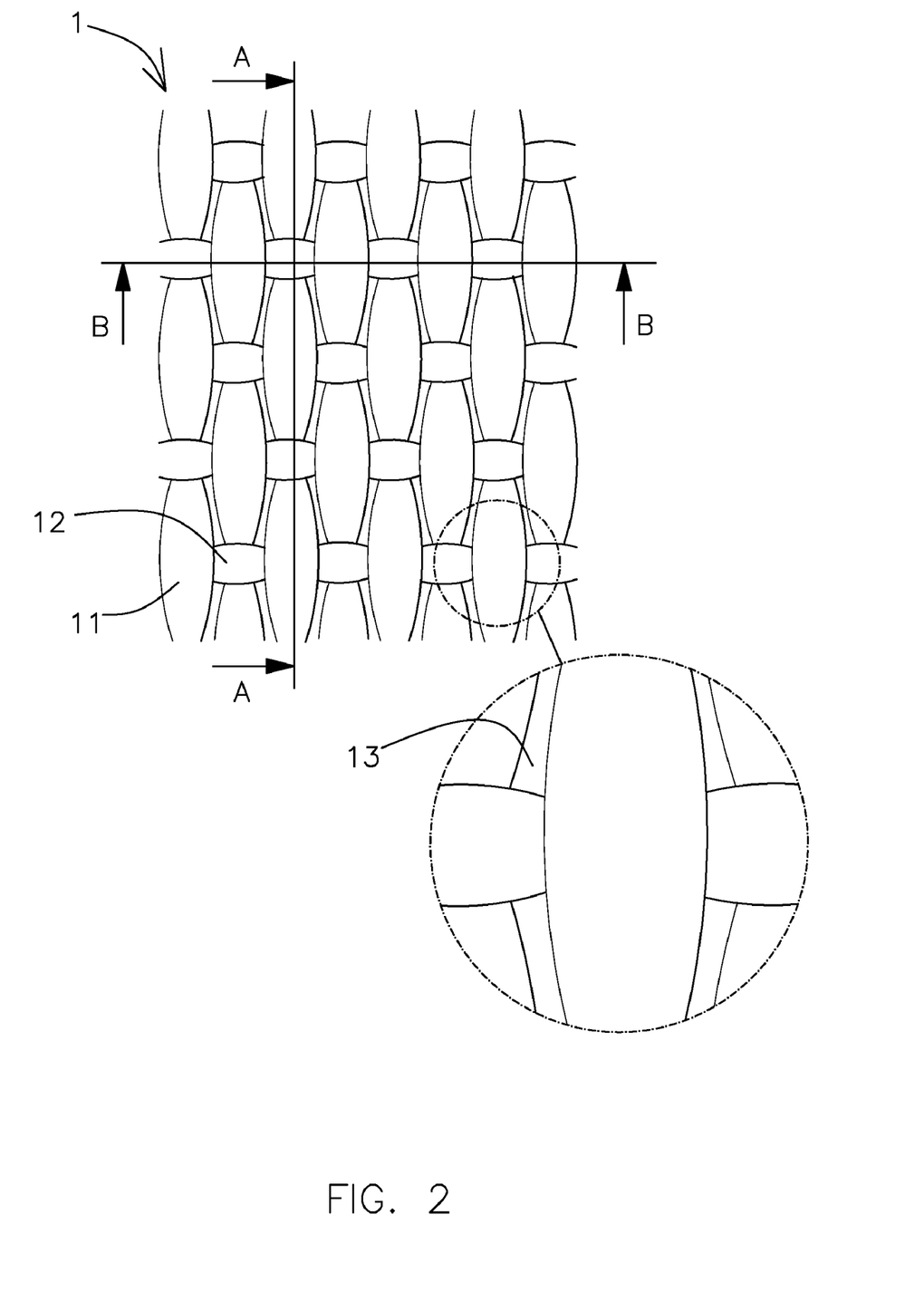
FIG. 2 is a plan view of a cloth layer of a conventional conveyor belt or treadmill belt.
Figure 3:
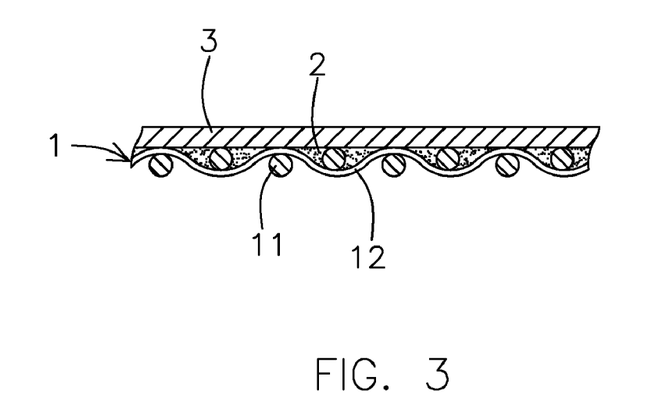
FIG. 3 is a horizontal cross sectional view of the cloth layer of the conventional conveyor belt or treadmill belt.
Figure 4:
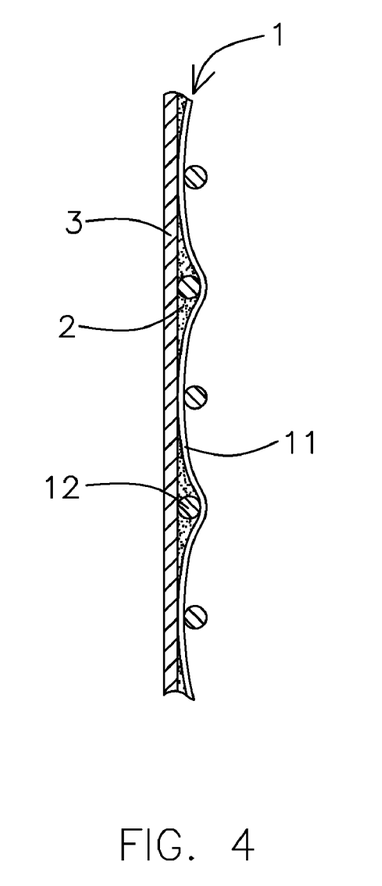
FIG. 4 is a longitudinal cross sectional view of the cloth layer of the conventional conveyor belt or treadmill belt.

As shown in FIGS. 2-4, the conventional conveyor belt or treadmill belt at least comprises:

a cloth layer 1 woven by at least one warp 11 and woof 12, a clearance 13 being formed between the warp 11 and the woof 12, an inner surface of the cloth layer 1 being fixed around outer sides of two transmission wheels;

an adhesive layer 2 serving as coating adhesive agent onto an outer side of the cloth layer 1 by using a gel coating machine so that the gel can merge into the clearance 13 of the cloth layer 1 and then the cloth layer 1 is dried by a dryer;

a leather layer 3 adhered on the outer surface of the cloth layer 1 by using the adhesive layer 2.

However, such a conventional conveyor belt or treadmill belt is easy to be peeled off and has poor stepping stress.

Besides, the color of a surface of the leather layer 3 is black or gray, having poor appearance.

The present invention has arisen to mitigate and/or obviate the afore-described disadvantages.

SUMMARY OF THE INVENTION

The primary object of the present invention is to provide a conveyor belt or treadmill belt that can dispose a shock absorbing structure in the laminating layer to obtain a preferred stepping comfortness.

A conveyor belt or treadmill belt in accordance with the present invention comprises:

a cloth layer woven by at least one warp and woof and having an outer surface and an inner surface in response to each other, a clearance passing through the inner and the outer surfaces of the cloth and being formed between the warp and the woof;

a pattern layer in response to the outer surface of the cloth layer including patterns formed thereon;

a laminating layer melted to couple between the outer surface of the cloth layer and the pattern layer, such that the laminating layer merges into the clearance between the warp and the woof of the cloth layer so that the laminating layer is integrally formed a rough connecting surface, the connecting surface engaging with the clearance of the cloth layer, hence another surface of the laminating layer is in connection with the pattern layer.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 5:
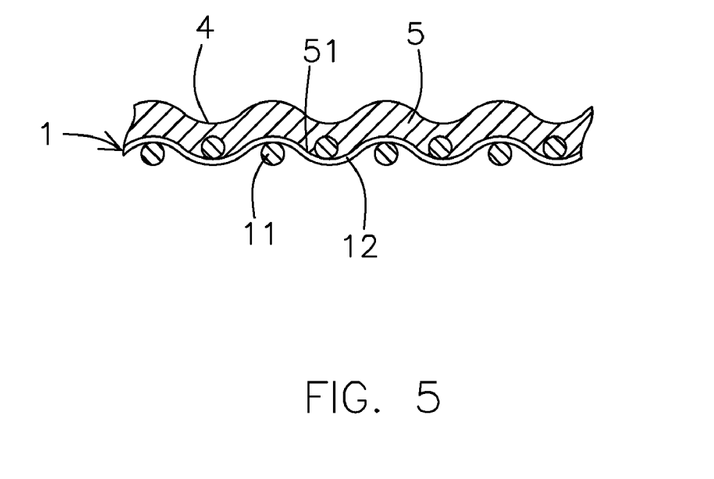
FIG. 5 is a horizontal cross sectional view of a conveyor belt or treadmill belt in accordance with a first embodiment of the present invention.
Figure 6:
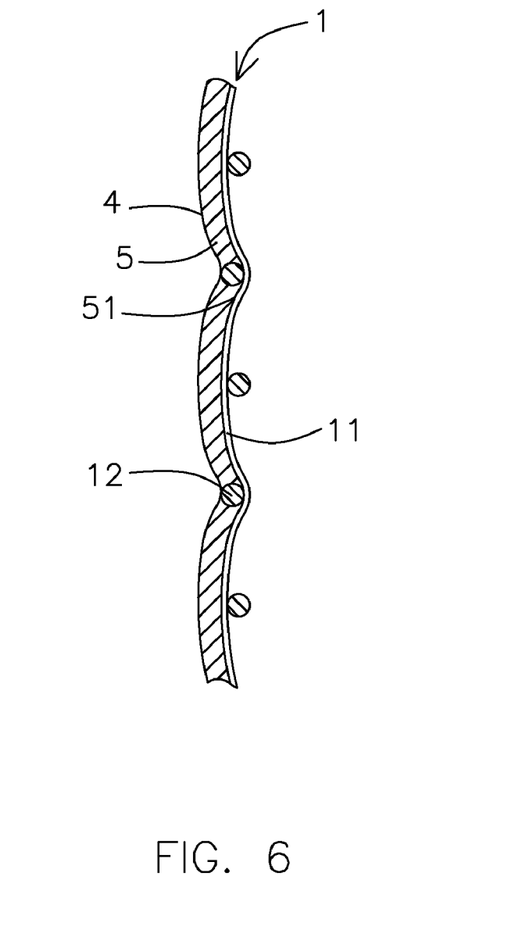
FIG. 6 is a longitudinal cross sectional view of the conveyor belt or treadmill belt in accordance with the first embodiment of the present invention.

Referring to FIGS. 5 and 6, a conveyor belt or treadmill belt in accordance with a first embodiment of the present invention at least comprises: a cloth layer 1 woven by at least one warp 11 and woof 12 and having an outer surface and an inner surface in response to each other, a clearance passing through the inner and the outer surfaces of the cloth layer 1 and being formed between the warp 11 and the woof 12, wherein the warp 11 and the woof 12 can be formed from yarns with anti-static agent or the cloth layer 1 is soaked in the anti-static agent to obtain anti-static effect;

a pattern layer 4 in response to the outer surface of the cloth layer 1 including patterns formed thereon;

a laminating layer 5 being molded to form a melted laminating film by using a T-shaped mold, the cloth layer 1 and the pattern layer 4 being conveyed to pass through the T-shaped mold so that the laminating layer 5 is melted to couple between the outer surface of the cloth layer 1 and the pattern layer 4, such that the laminating layer 5 merges into the clearance between the warp 11 and the woof 12 of the cloth layer 1 so that the laminating layer 5 is integrally formed a rough connecting surface 51, the connecting surface 51 engaging with the clearance of the cloth layer 1, thereby enhancing adhering area, anti-peel strength, and tensile strength. Another surface of the laminating layer 5 is in connection with the pattern layer 4 to increase appearance space, and the laminating layer 5 and the pattern layer 4 are provided with rough surfaces individually to providing steeping friction. It is to be noted that the laminating layer 5 is added with anti-static agent to prevent from generating static electricity.

Form above-mentioned description, the laminating layer 5 couples with the cloth layer 1 and the pattern layer 4 without through laminating process, the laminating layer 5, the cloth layer 1, and the pattern layer 4 can be simultaneously finished in an automatically coupling process, thereby enhancing production efficiency.

An area of the connecting surface 51 of the laminating layer 5 is larger than that of the conventional conveyor belt, because the connecting surface 51 is merged in the clearance between the warp 11 and the woof 12 of the cloth layer 1, a multi-directional stepping stress can be endured so that the laminating layer 5 and the cloth layer 1 are coupled securely to obtain larger stepping stress. Furthermore, because the connecting surface 51 is integrally formed with the laminating layer 5, having a preferred spread effect of stress to improve tensile strength of the cloth layer 1.

Figure 7:
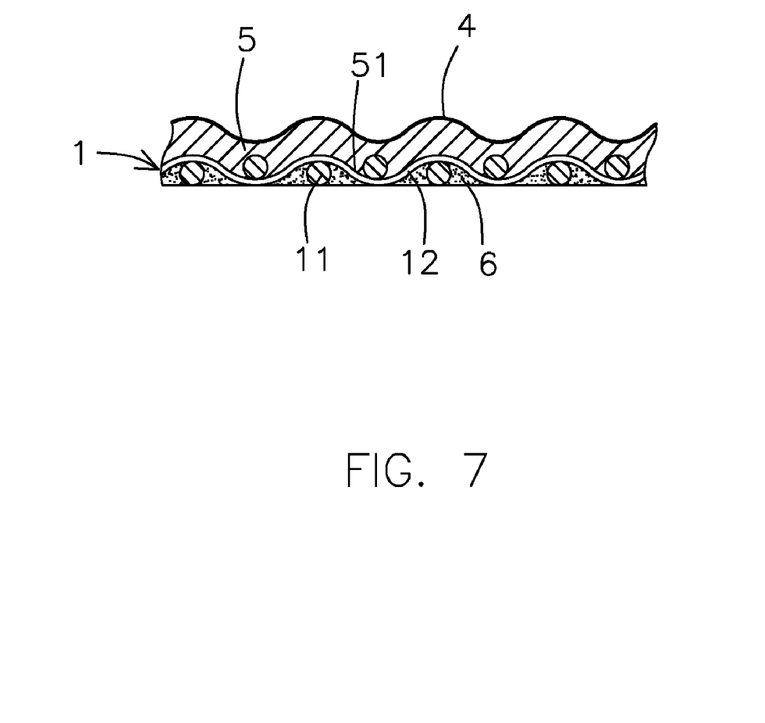
FIG. 7 is a horizontal cross sectional view of a conveyor belt or treadmill belt in accordance with a second embodiment of the present invention.

Referring to FIG. 7, a conveyor belt or treadmill belt according to a second embodiment of the present invention at lease comprises:

a gel layer 6 coated on the inner surface of the cloth layer 1 so as to link with the connecting surface 51 of the laminating layer 5, thus engaging the cloth layer 1 between the gel layer 6 and the laminating layer 5. The gel layer 5 can improve the anti-wear capacity between the inner surface of the cloth layer 1 and two transmission wheels, and the cloth layer 1, the laminating layer 5, and the gel layer 6 can be joined securely but not be peeled off easily. It is to be noted that the gel layer 6 is added with anti-static agent to prevent from generating static electricity.

Figure 8:
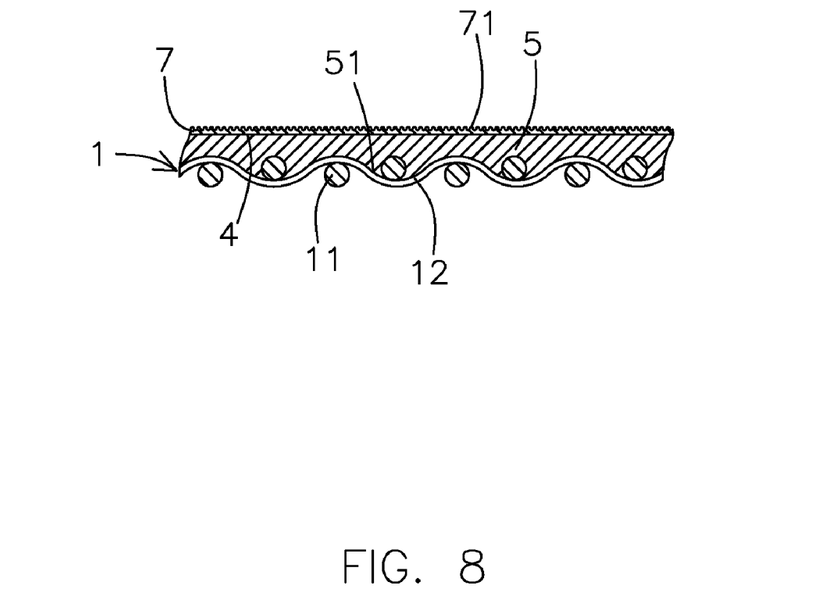
FIG. 8 is a horizontal cross sectional view of a conveyor belt or treadmill belt in accordance with a third embodiment of the present invention.

Referring to FIG. 8, a conveyor belt or treadmill belt according to a third embodiment of the present invention at lease comprises:

a transparent second laminating layer 7 roll formed on an outer surface of a pattern layer 4 to prevent the pattern layer 4 from being worn, and an outer surface of the second laminating layer 7 is designed in a rough manner to provide stepping friction. The laminating layer 7 further includes rough patterns 71 formed thereon to obtain anti-slip purpose.

Figure 9:
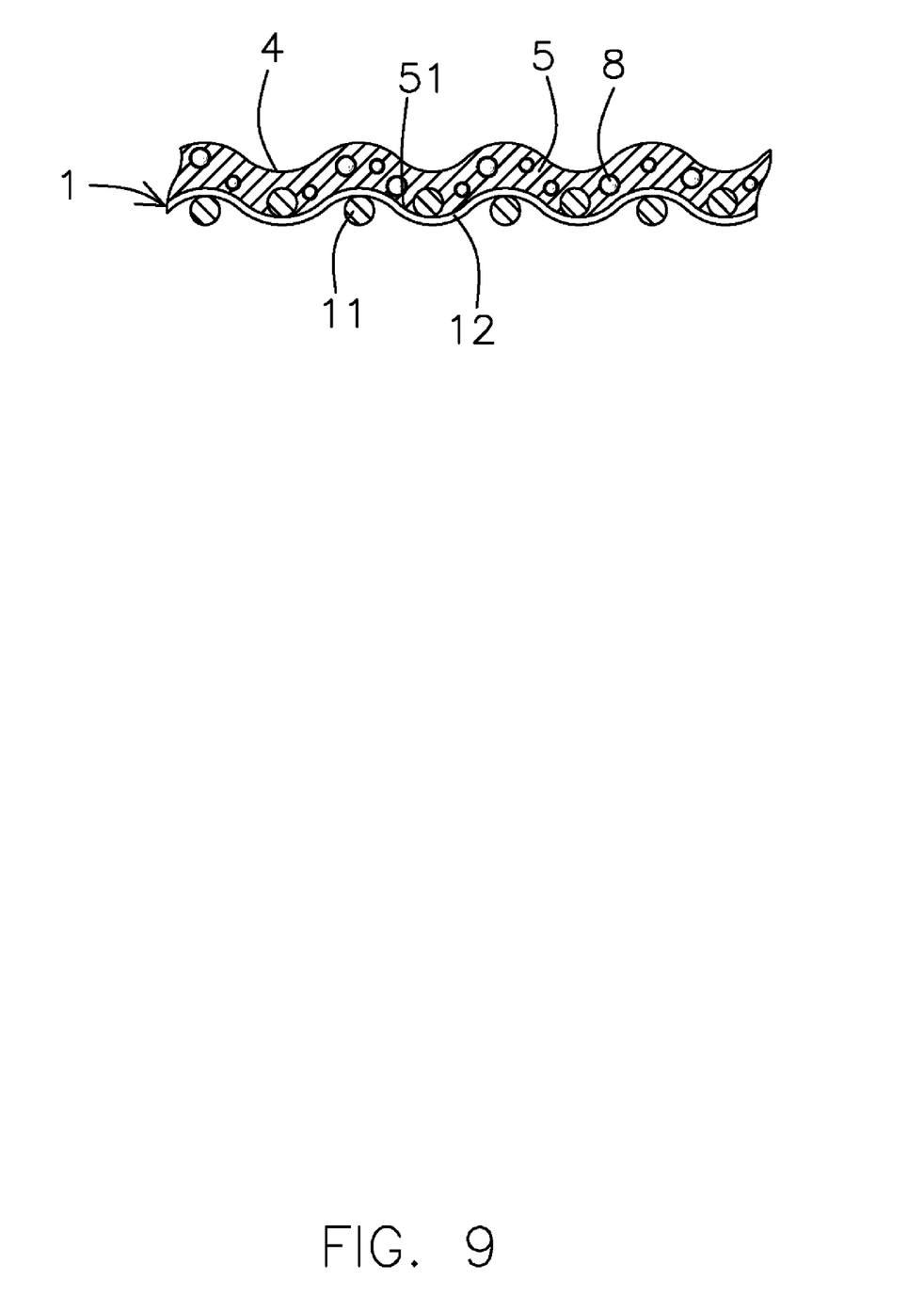
FIG. 9 is a cross sectional view showing a laminating layer being provided with a shock absorbing structure.
Figure 10:
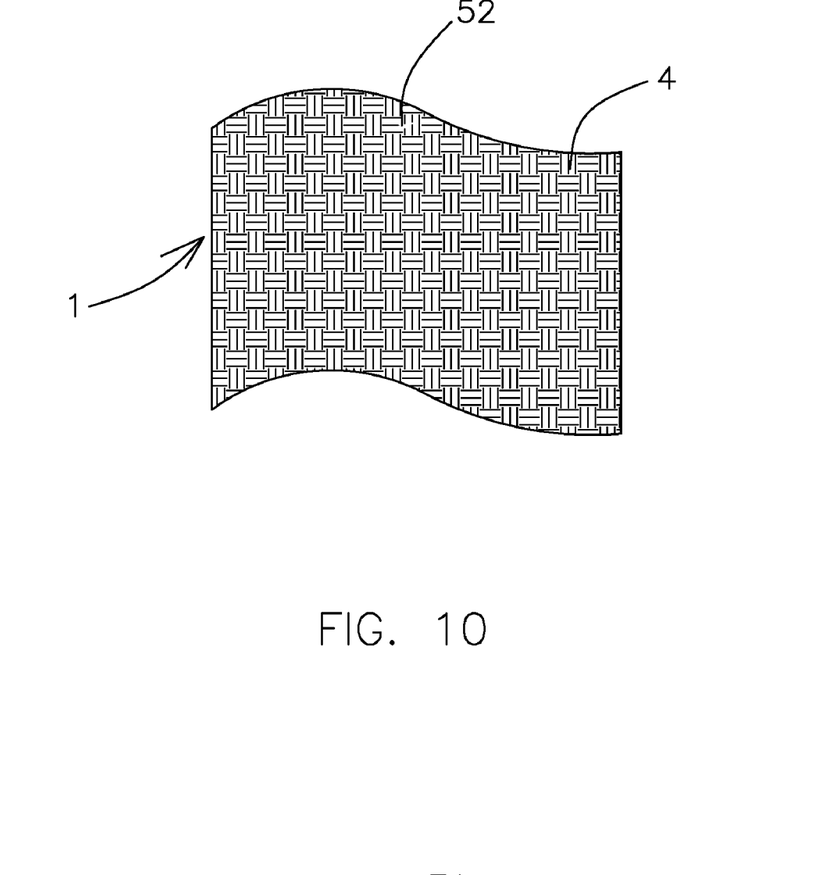
FIG. 10 is a top plan view of the shock absorbing structure of the conveyor belt or treadmill belt in accordance with the second embodiment of the present invention.
Figure 11:
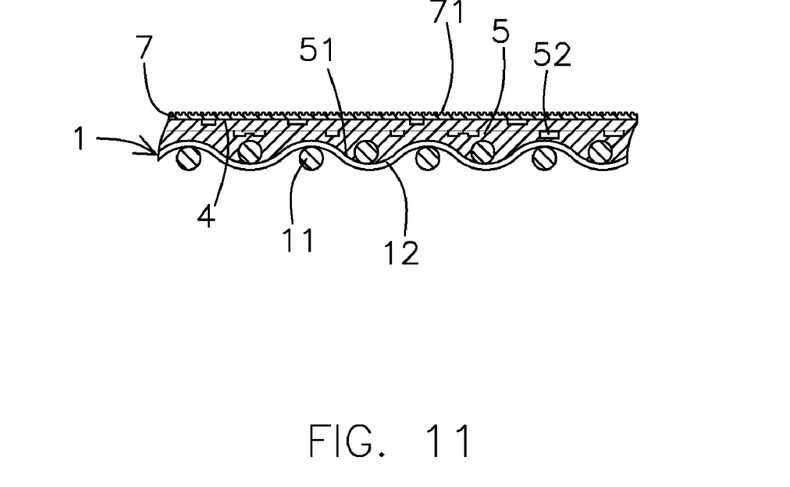
FIG. 11 is a cross sectional view of the shock absorbing structure of the conveyor belt or treadmill belt in accordance with the second embodiment of the present invention.

A laminating layer 5 is provided with a shock absorbing structure to obtain stepping comfortness. As shown in FIG. 9, the shock absorbing structure includes a plurality of hollow inflation balls 8 or glass beads mounted on the laminating layer 5. As illustrated in FIGS. 10 and 11, a plurality of air chambers 52 are arranged in the laminating layer 5 to decrease the weight of the laminating layer 5.

Figure 12:
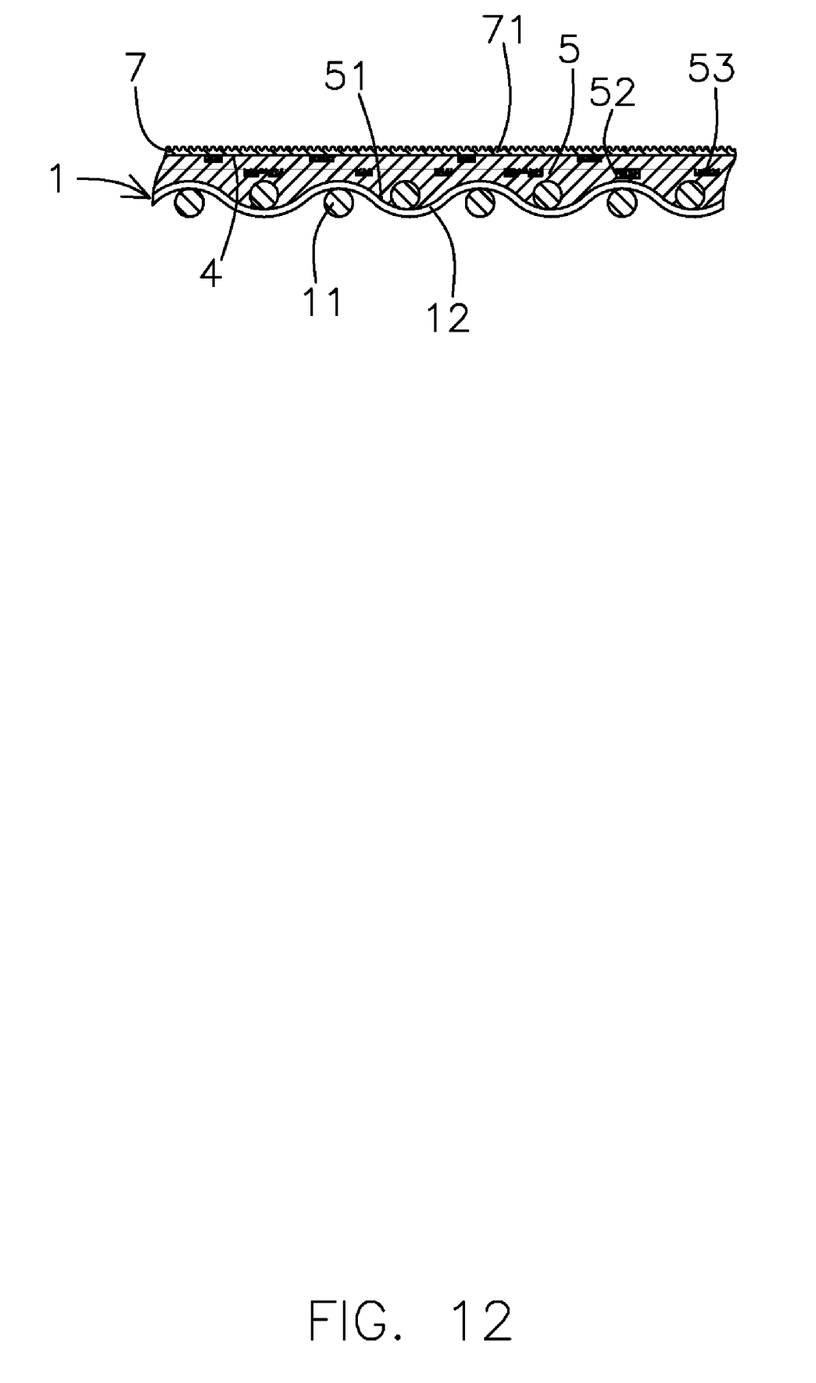
FIG. 12 is a cross sectional view of the shock absorbing structure of the conveyor belt or treadmill belt in accordance with a third embodiment of the present invention.

The laminating layer 5 is provided with a shock absorbing structure to obtain stepping comfortness. As shown in FIG. 9, the shock absorbing structure includes a plurality of hollow inflation balls 8 or glass beads disposed on the laminating layer 5. As illustrated in FIGS. 10 and 11, a plurality of air chambers 52 are arranged in the laminating layer 5 to decrease the weight of the laminating layer 5, wherein the chambers 52 are rolled to concavely form on the laminating layer 5, and the chambers 52 can be arranged in a sole, multiple successive, or partially successive manner, the laminating layer 5 can be a double-layer design. As shown in FIG. 12, the chamber 52 is filled with shock absorbing medium, such as gel, fluid, or gas to achieve shock absorbing purpose.

While we have shown and described various embodiments in accordance with the present invention, it is clear to those skilled in the art that further embodiments may be made without departing from the scope of the present invention.

What is claimed is:

1. A conveyor belt or treadmill belt comprising:
  a cloth layer woven by at least one warp and woof and having an outer surface and an inner surface in response to each other, a clearance passing through the inner and the outer surfaces and being formed between the warp and the woof;
  a pattern layer in response to the outer surface of the cloth layer including patterns formed thereon;
  a laminating layer molded to form a melted laminating film by using a T-shaped mold, the cloth layer and the pattern layer being conveyed to pass through the T-shaped mold;
  wherein a laminating layer is melted to couple between the outer surface of the cloth layer and the pattern layer,
  wherein the laminating layer is merged into the clearance between the warp and the woof;
  wherein the laminating layer is integrally formed a rough connecting surface which engages with the clearance of the cloth layer, and another surface of the laminating layer is in connection with the pattern layer;
  wherein the laminating layer and the pattern layer are provided with rough surfaces individually to provide steeping friction.

2. The conveyor belt or treadmill belt as claimed in claim 1, wherein a gel layer is added with anti-static agent and coated on the inner surface of the cloth layer so as to link with the connecting surface of the laminating layer, thus engaging the cloth layer between the gel layer and the laminating layer.

3. The conveyor belt or treadmill belt as claimed in claim 1, wherein a transparent second laminating layer is roll formed on an outer surface of the pattern layer to protect the pattern layer, and the laminating layer further includes rough patterns formed thereon.

4. The conveyor belt or treadmill belt as claimed in claim 2, wherein a transparent second laminating layer is roll formed on an outer surface of the pattern layer to protect the pattern layer, and the laminating layer further includes rough patterns formed thereon.

5. The conveyor belt or treadmill belt as claimed in claim 1, wherein between the cloth layer and the laminating layer are added anti-static agent.

6. The conveyor belt or treadmill belt as claimed in claim 2, wherein between the cloth layer and the laminating layer are added anti-static agent.

7. The conveyor belt or treadmill belt as claimed in claim 1, wherein the laminating layer is provided with a shock absorbing structure.

8. The conveyor belt or treadmill belt as claimed in claim 2, wherein the laminating layer is provided with a shock absorbing structure.

9. The conveyor belt or treadmill belt as claimed in claim 7, the shock absorbing structure includes a plurality of hollow inflation balls disposed on the laminating layer.

10. The conveyor belt or treadmill belt as claimed in claim 8, the shock absorbing structure includes a plurality of hollow inflation balls disposed on the laminating layer.

11. The conveyor belt or treadmill belt as claimed in claim 7, the shock absorbing structure includes a plurality of hollow glass beads disposed on the laminating layer.

12. The conveyor belt or treadmill belt as claimed in claim 8, the shock absorbing structure includes a plurality of hollow glass beads disposed on the laminating layer.

13. The conveyor belt or treadmill belt as claimed in claim 7, wherein a plurality of air chambers are arranged in the laminating layer, the chambers are formed on the laminating layer and can be arranged in a sole, multiple successive, partially successive manner, and the chamber is filled with shock absorbing medium.

14. The conveyor belt or treadmill belt as claimed in claim 8, wherein a plurality of air chambers are arranged in the laminating layer, the chambers are formed on the laminating layer and can be arranged in a sole, multiple successive, partially successive manner, and the chamber is filled with shock absorbing medium.

* * * * *